United States Patent [19]

Büchele

[11] 4,157,034
[45] Jun. 5, 1979

[54] ELECTRONIC HEAT AMOUNT METER

[75] Inventor: Karl Büchele, Forchheim, Fed. Rep. of Germany

[73] Assignee: Industrie-Werke Karlsruhe Augsburg Aktiengesellschaft, Fed. Rep. of Germany

[21] Appl. No.: 862,679

[22] Filed: Dec. 21, 1977

Related U.S. Application Data

[63] Continuation-in-part of Ser. No. 725,144, Sep. 20, 1976.

[30] Foreign Application Priority Data

Sep. 20, 1975 [DE] Fed. Rep. of Germany ....... 2542025

[51] Int. Cl.$^2$ ............................................. G01K 17/18
[52] U.S. Cl. ................................................... 73/193 R
[58] Field of Search ..................................... 73/193 R

[56] References Cited

U.S. PATENT DOCUMENTS

| 3,489,006 | 1/1970 | Holdsworth | 73/193 |
| 4,048,852 | 9/1977 | Sakakibara | 73/193 |

FOREIGN PATENT DOCUMENTS

| 2320339 | 11/1974 | Fed. Rep. of Germany | 73/193 |
| 643499 | 9/1928 | France | 73/193 |
| 1247036 | 10/1960 | France | 73/193 |
| 663083 | 6/1948 | United Kingdom | 73/193 |

*Primary Examiner*—Herbert Goldstein
*Attorney, Agent, or Firm*—McGlew and Tuttle

[57] ABSTRACT

The meter forms part of a heating system supplied with thermal energy in the form of hot water from a heat generator, and serves to determine the amount of heat supplied to a consumer, for the purpose of appropriately charging the consumer for incurred heating costs. The meter includes a computer, operating on the analog principle, a volumeter and connection elements for connection to signal processing devices. The volumeter is formed by a first tubular body through which the hot water flows to the consumer, and this first tubular body is surrounded coaxially, at a definite radial spacing therefrom, by a second tubular body so that the two tubular bodies define a completely closed annular space. The cooled hot water returns through a return line. The supplied hot water in the first tubular body constitutes a primary medium flowing therethrough, and the completely closed annular space receives a secondary medium which is heated by the primary medium. A temperature sensor and a pressure head probe are operatively connected to the first tubular body, a second temperature sensor is operatively connected to the return line, and electronic elements convert the pressure head into an electrical quantity proportional to the volume of the primary medium flowing through the first tubular body. The temperature sensors serve to determine the heat amount. A thermogenerator is connected in communication with the completely closed annular space, for generation of electric energy by the heat of the secondary medium, and an electronic transformer is connected to the thermogenerator to convert the generated electric energy into operating potentials applied to the computer and to the volumeter.

12 Claims, 9 Drawing Figures

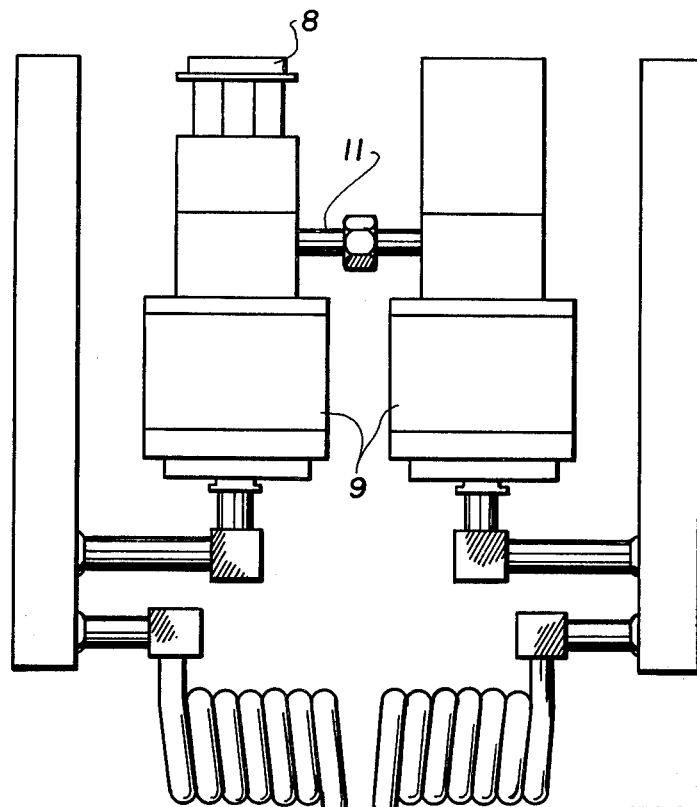
FIG. 7
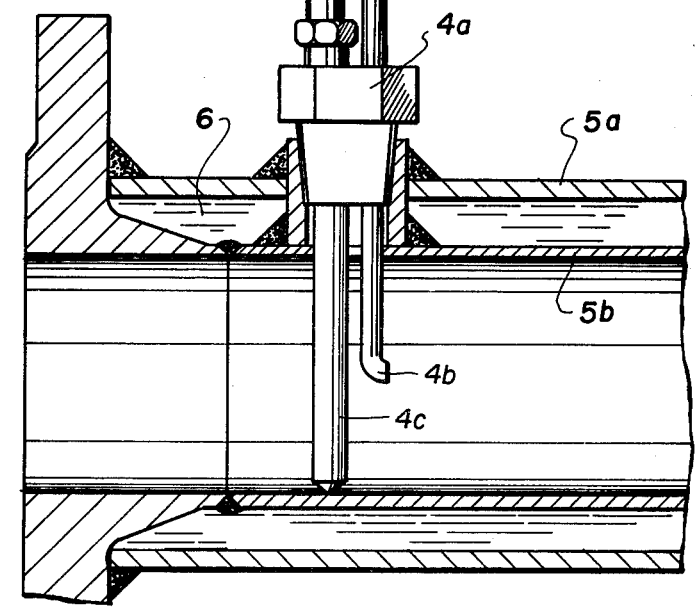

ELECTRONIC HEAT AMOUNT METER

CROSS-REFERENCE TO RELATED APPLICATION

This application is a continuation-in-part of application Ser. No. 725,144, filed Sept. 20, 1976, for "ELECTRONIC HEAT AMOUNT METER".

FIELD AND BACKGROUND OF THE INVENTION

This invention relates to an electronic heat amount meter comprising a computer operating on the analog principle, a volumeter, and means for connecting signal processing devices thereto.

An already known electronic heat amount meter substantially comprises an electronic computer, operating on the analog principle, and a mechanical volumeter. This meter is supplied from the power system.

Because of the basic design of this meter, certain limits are set to its application since it does not indicate the instantaneous value of the heat consumption and the rate of flow of the heat carrier, nor is it provided with suitable connecting elements for further signal processing devices, for example, recorders. In practice, this alone eliminates the possibility of controlling open and/or closed loop control members which would be provided adjacent the installation. In addition, for economical reasons, a battery power supply cannot be considered, since the current consumption is relatively high.

Another known electronic heat amount meter also comprises a computer which, however, operates on the digital principle, and a mechanical volumeter. In this case, the computing unit is powered by a battery. This, it is true, permits an operation independent of the power line, but the provided battery has only a limited capacity so that an exchange is necessary from time to time.

Finally, still another known electronic heat amount meter comprises an electronic computer operating on the digital principle, and a mechanical volumeter. The computer is supplied from the power line. Even though digital computers may be useful for certain applications, they are not suitable for the purposes of the present invention. It is also disadvantageous, or, at least, of little value, for the present invention to be dependent only on the power line.

Primarily, however, the just mentioned known designs of heat amount meters are not satisfactory in view of the basic concept of their mechanical volumeters, since they involve the risk of a not inconsiderable wear due to impurities contained in the heat carrier and also precipitations therefrom, particularly at higher temperatures. According to experience, the wear begins after only a relatively short service time and results in inaccuracies of measurement.

It is obvious that such inaccuracies in measurement also entail inaccuracies in the determination of charging for the consumed heat quantities. In addition, with the known design of volumeters, the occurrence of creeping quantities, which are due to friction and adulterate the result of measurement even if to a limited extent, cannot be excluded.

A further problem with the known volumeters is that their admissible operational temperature is limited to about 90° C. For an operation at higher temperatures (long distance heating systems operate within a range of, for example, up to 130° C.) only expensive constructions are available.

Because of the wear to be expected in the known constructions of volumeters, not inconsiderable maintenance costs must be taken into account, since the devices must be periodically not only checked and cleaned but also perhaps even exchanged. It is further clear that the permanently necessary maintenance creates a need for qualified personnel and suitable material, devices and tools.

As already mentioned above, the known electronic computers of this kind do not indicate the instantaneous values of heat consumption nor the volumetric flow (rate of flow). Exactly this, however, is required from non-mechanical meters in order to be able to make adjustments in the system, for example, to limit the rate of flow to a maximum. Limits are set to the application or use of the meters of the prior art also by the fact that they are not available for influencing other necessary open and/or closed loop control members of the system.

As to the power supply for heat amount meters of the prior art, the connection to the power line results in not inconsiderable installation costs, which further increase the expenditures to an undesirable extent. The drawback of the known devices of being dependent on the power line (assume, for example, a power failure) may be, it is true, avoided by using batteries, but relatively narrow limits are set for the power supply from such energy accumulators, particularly for electronic computers operating on the analog principle, because of the continuous energy consumption and also in view of the limited power capacity. In addition, the connection of a heat amount meter to the power source must be secure against misuse, i.e. independent of the respective private meter, and tamperingproof from the outside.

Not least for remedying the insufficiencies of mechanical volumeters mentioned in the foregoing and known in the art, volumeters of the non-mechanical type have also been developed. Such meters make use, for example, of ultrasonics, of the inductivity of an electric field, of isotope radiation, of frequencies of eddies separating from a body placed in the fluid, as well as of the effective head drop through an orifice, plate, etc.

For example, U.S. Pat. Nos. 1,267,758 and 1,948,234, French Patent No. 1,247,036, and British Patent No. 663,083 show meters in which the differential pressure is produced by an orifice. Such orifices, however, have numerous disadvantages. Thus, they provide only a small measuring range, and the measuring accuracy is very unstable due to contamination and wear of the orifice. In these meters, the differential pressure signal is converted to an electric signal through more or less complicated mechanical systems, or liquid-based systems, which are affected by friction entailing additional inaccuracies and which, as far as the liquid-based systems are concerned, must be handled very carefully during transportation.

These devices have been tested and proved satisfactory. However, for normal application, they are not, or not quite, suitable as heat amount meters since they are, as compared to the heat amount meters of the prior art discussed above, considerably more expensive. As for their supply with power, there also applies what has been said in the foregoing about the individual known heat amount meters.

SUMMARY OF THE INVENTION

In view of the drawbacks inherent in the heat amount meters of the prior art, the present invention is directed to a simple and low-priced electronic heat amount meter operating on the analog principle, which is independent of the power line supply, economizes energy, makes a battery exchange completely unnecessary during the entire service time, comprises the needed and desirable output equipment and, primarily, includes an almost non-wearing and, in practice, maintenance-free volumeter.

In accordance with the invention, the volumeter comprises substantially a first tubular body which is coaxially surrounded, at a definite radial spacing therefrom, by a second tubular body. The first tubular body is provided with means for receiving at least one temperature sensor and at least one pressure-head probe as well as electronic elements for converting the pressure-head into a voltage or current proportional to the volume of a primary medium flowing through the first tubular body. The completely closed annular space formed by the coaxial arrangement of the two tubular bodies receives a secondary medium heated by the primary medium flowing through the first tubular body, and communicates, through pipes or the like, with a generator, in particular, a thermogenerator, which supplies operating potentials to both the computer and the volumeter, by means of an electronic transformer. By the term "electronic transformer" is meant an electronic type voltage transformer converting a low-voltage, high amperage current, into a high-voltage, low amperage current.

In keeping with the underlying concept of the invention, and in the presence of corresponding conditions, the volumeter may also be designed with a single tubular body.

The inventive heat amount meter is further distinguished by the following features:

(a) A transformer transforms the low voltage produced by the thermogenerator into the operating voltage necessary for operating the volumeter and computer, by means of a blocking oscillator, chopper, or the like, suitable for low voltage, which is followed, if desired, by electronic means for an automatic switching off of the volumeter and computer.

(b) Aside from electronic switching elements, known per se, for an analog connection of differential temperature and volume of the heat carrier, the computer comprises further electronic switching elements making it possible, in particular, to connect signal processing elements, to indicate the instantaneous values with an automatic range switching, to indicate the measuring range in a current-saving manner, to provide for a self-checking of the operational capability of the computer, and to effect automatic suppression of minimum signal levels.

(c) The differential pressure signal, measured by means of the pressure-head probe, is converted in a transducer into a voltage which is proportional to the pressure head, and this voltage is applied to a square-root deriver. After the square-root deriving operation, the differential-pressure signal is available as a signal proportional to the volumetric flow.

The inventive features are further developed in several directions. First, it is relevant that the pressure-head probe is a probe producing a mean value over the cross section of the fluid flow to be measured.

Further, it is of importance for the inventive idea that both mechanical and electronic switching elements, such as solenoid valves, electronic sample and hold elements, electronic switches, or the like are used for an automatic and periodic zero balancing of the transducer and the square-root deriver.

Finally, in accordance with another feature of the invention, electronic switching elements, such as electronic switches, are used for periodically switching off the supply voltage for the transducer as well as for the square-root deriver. Other electronic switching elements, such as sample and hold elements, are used for storing the signal during the switch-off period of the supply voltage and during the balancing period.

The already mentioned inventive concept of using electronic switching elements also for the automatic and periodical zero balancing of the transducer and the square-root deriver is further developed, in accordance with the invention, by using the electronic switching elements, for example, electronic switches or the like, in addition, for adjusting the actual square-root deriving operation to the desired square-root deriving operation as a function of the output signal.

Other electronic switching elements, such as multivibrators, counters, or the like, may be used, in accordance with the invention, in a particularly advantageous manner, also for controlling periodical operations (for example, the zero balancing), for switching off the voltage supply, for storing the output signal, as well as for shifting the square-root deriving operation. If designed as bistable elements, mechanical switching elements comprising solenoid valves are particularly suitable for the inventive purpose.

The invention offers a number of advantages which already follow from the elimination of the drawbacks of the prior art which have been mentioned above. The invention, of course, offers still further advantages.

Aside from the fact that the pressure-head probe, used for measuring the amount in accordance with the invention, does not comprise any mechanical parts and, consequently, in practice, is wear-free and maintenance-free as well as immune against contamination and deposits in contact with the medium, thus permitting higher measuring accuracy, it is particularly advantageous that the thermal energy radiated by the medium flowing through the volumeter produces, through a secondary medium thereby heated, and with utilization of the Peltier effect known per se, a voltage which, upon an appropriate amplification, is perfectly capable of being used for the operation of the heat amount meter. In consequence, neither a power line nor an energy accumulator (battery) are needed for operating the meter.

A further advantage resulting from the invention is that the meter can be operated at temperatures up to 180° C., in contradistinction to comparble devices of the prior art where, as a rule, a temperature of only 90° C. is admitted, and that, for example, the indication of instantaneous values makes it easily possible to adjust maximum rates of flow.

During the flow of the hot medium through the device, a sufficient amount of electrical energy is obtained for operating the heat amount meter. The consumption of this energy can advantageously be reduced if, in accordance with the invention, the volume is measured intermittently. Another advantage is that, due to the automatic and regular zero balancing, the long-time operation of the inventive heat amount meters is decidedly improved and the service life is extended.

An object of the invention is to provide an improved electronic heat amount meter comprising a computer operating on the analog principle, a volumeter, and means for connecting signal processing devices thereto.

Another object of the invention is to provide such an electronic heat amount meter which is simple and low in price, independent of a power line supply, economical of energy, obviating the necessity of battery changes, including the needed and desirable output equipment and including a substantially non-wearing and substantially maintenance-free volumeter.

A further object of the invention is to provide such an electronic heat amount meter including a thermogenerator supplying all the operating potentials necessary for both the computer and the volumeter, by means of an electronic transformer.

For an understanding of the principles of the invention, reference is made to the following description of a typical embodiment thereof as illustrated in the accompanying drawings.

BRIEF DESCRIPTION OF THE DRAWINGS

In the drawings:

FIG. 1a is an end elevation view, partly in section, corresponding to FIG. 1;

FIG. 7 is an elevation view, partly in section, and illustrating, in principle, the mounting arrangement of the pressure-head probe.

DESCRIPTION OF THE PREFERRED EMBODIMENT

Figure 1:
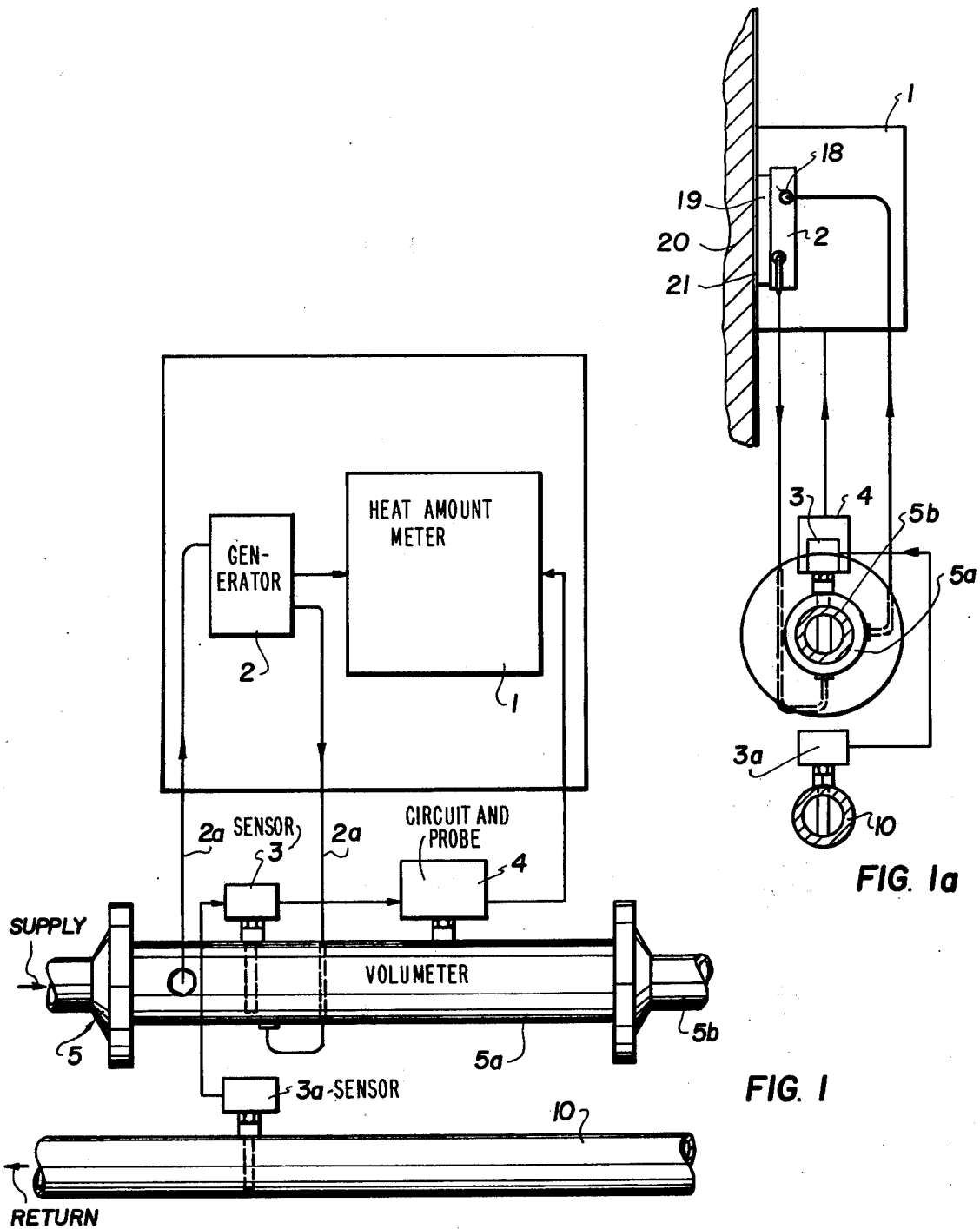
FIG. 1 is a diagrammatic elevation view illustrating, in principle, the design of the heat amount meter embodying the invention as connected in a heated fluid supply line and a cooled fluid return line.

Referring first to FIGS. 1 and 1a, the heat amount meter 1 is associated, on the one hand, with a generator 2, for example, a thermogenerator, and, on the other hand, with a volumeter 5. As indicated by the arrows, the liquid heating medium, such as hot water, entering the system, flows through an inner tube 5b of volumeter 5 to the heating installation, and the cooled liquid heating medium is returned through a return line 10. Inner tube 5b of volumeter 5 is coaxially surrounded by an outer tube 5a, in radially spaced relation thereto, and defining, with tube 5b an annular space. At least one temperature sensor 3 communicates with inner tube 5b carrying the supplied heating medium, and at least one temperature sensor 3a is operatively associated with return line 10. A pressure head probe communicates with inner tube 5b. Temperature sensors 3a and 3 are connected to each other and to pressure head probe with it circuitry 4 which, in turn, is connected to heat amount meter 1, as indicated in FIG. 1, and thermogenerator 2 is also connected to heat amount meter 1. The annular space between tubes 5a and 5b has sealed therein a secondary medium 6. The values from probe and circuitry 4, and sensors 3, 3a are related to each other in known ways.

Figure 2:
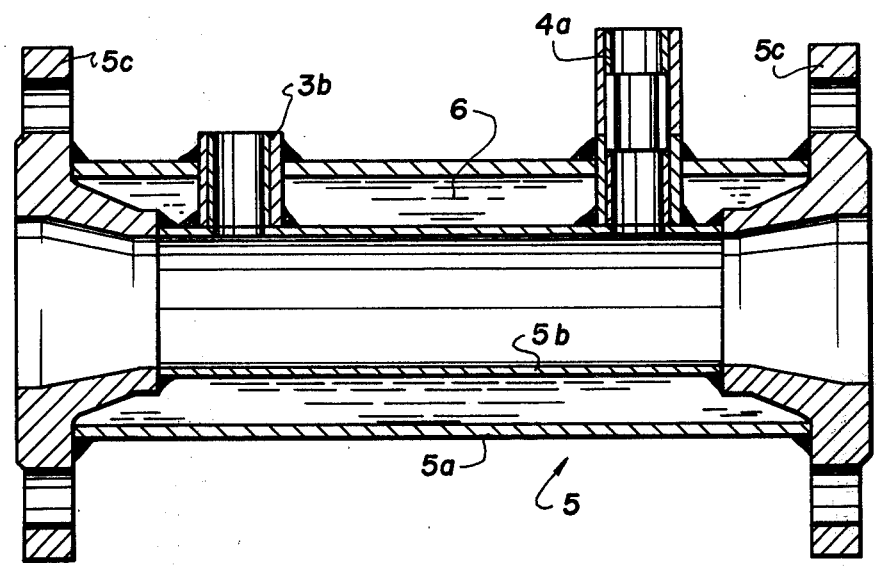
FIG. 2 is a side elevation view, partly in section, of the volumeter forming part of the heat amount meter.
Figure 2A:
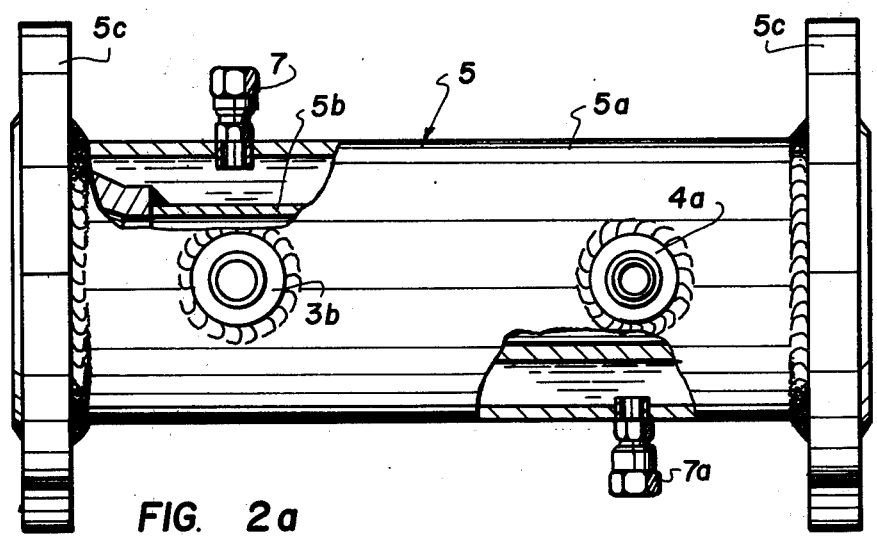
FIG. 2a is a top plan view, partly in section, of the volumeter shown in FIG. 2.

The construction of volumeter 5 is shown in FIGS. 2 and 2a. Outer tube 5a and inner tube 5b, which is coaxial thereof, are tightly connected to each other, for example, by means of external flanges 5c and, in the space formed between the tubes, the secondary medium 6 is received. Secondary medium 6 is heated by the heat of the entering primary medium flowing through inner tube 5b. The thermal energy thus obtained is removed at connection point 7, and conveyed, through a pipe 2a, as diagrammatically shown in FIGS. 1 and 1a, to thermogenerator 2 wherefrom a return pipe 2a leads back to a connection 7a. Medium 6 within its annular space and connections 7, 7a thus comprises thermal energy supply means for generator 2. Connections 3b are provided for mounting temperature sensors 3, 3a and a connection 4a for mounting circuitry and head probe 4.

The operation of volumeter 5 is based on the following relation: A water quantity q flowing through inner tube 5b is determined by the equation $$q = A \sqrt{P_{head}} \cdot k$$

where A is the free cross section of inner tube 5b $P_{head}$ is the measured pressure head, and $k_1$ is a factor of valence and proportionality.

In order to eliminate the static pressure, the head probe 4 projecting through outer tube 5a into inner tube 5b measures the head as a differential pressure. This differential pressure is applied to a pressure-voltage transducer downstream of head probe 4, the pressure-voltage transducer being illustrated at I in FIG. 4 and at 8 in FIG. 7. The transducer converts the differential pressure into a voltage which is applied to a square-root deriver, shown at III in FIG. 4. While taking into account a correction factor k, the output voltage of the square-root deriver III is directly proportional to the velocity v of the medium flowing through inner tube 5b of volumeter 5.

Since the volume V of the medium flowing through inner tube 5b is equal to the product of the velocity v and the cross section A of inner tube 5b, the output voltage of square-root deriver III is also proportional to the amount of the medium flowing through inner tube 5b.

Figure 6:
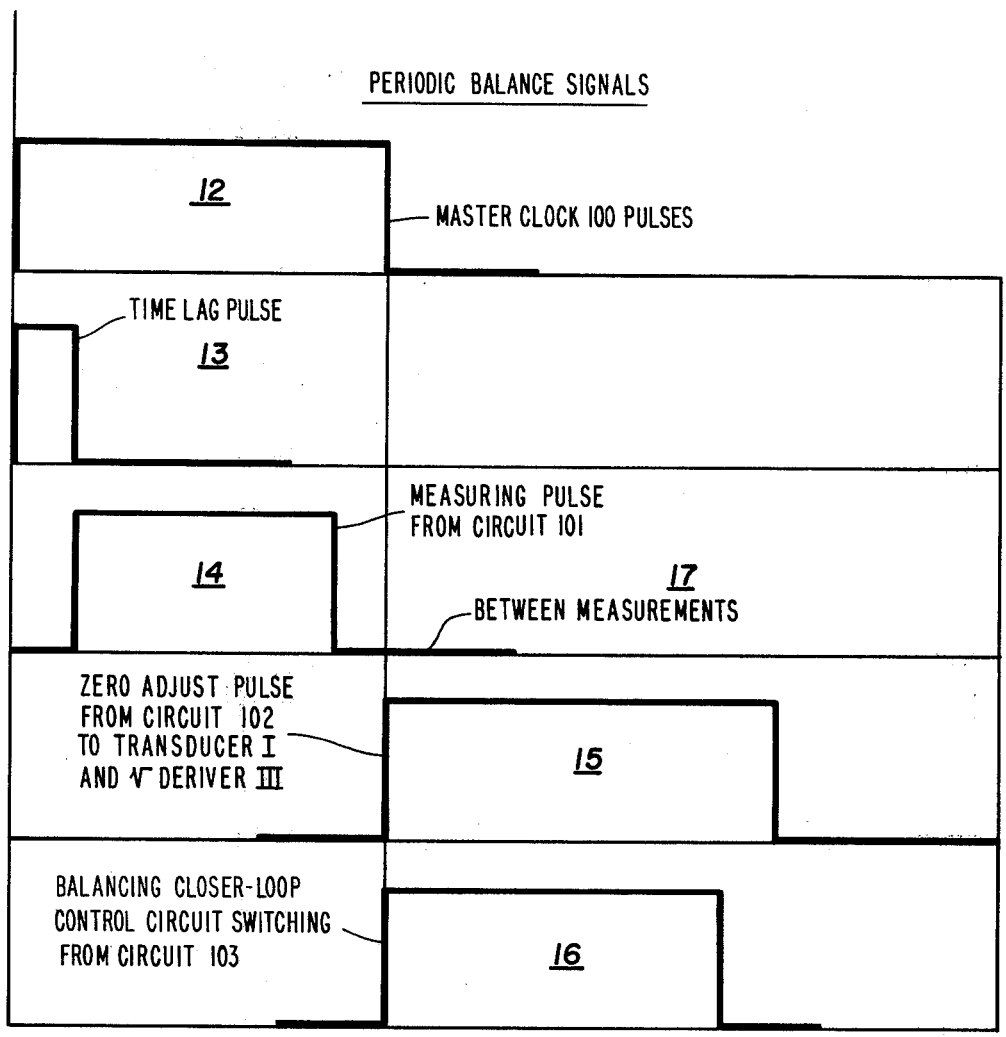
FIG. 6 is a graphic illustration of the control pulses which can be produced with the control circuitry shown in FIG. 5.

To eliminate drift due to temperature and aging, a periodic, automatic zero balancing is provided in pressure-voltage transducer I and square-root deriver III. The zero balancing for pressure-voltage transducer I is effected by the closed loop control circuit V of FIG. 4. The two solenoid valves 9 of FIG. 7 are pressure balanced through a line 11, to reduce the differential pressure at the input of pressure-voltage transducer I to zero, while the static pressure is maintained. Thereby, there is produced a reference voltage which is equivalent to the output signal of pressure-voltage transducer I in the balanced state. This voltage level is a new starting point (equal to zero) for the measuring signal of pressure-voltage transducer I. Solenoid valves 9 are bistable for energetic reasons. Thus when a measurement is taken the valve connected to transducer 8 opens the path between head 4 and transducer 8. Balancing is achieved by opening both valves 9 to permit flow in line 11 to equalize pressures from the two pressure input lines 4b, 4c or measurement points from head 4a as seen in FIG. 7. FIG. 6 shows sequence pulses for this operation.

Figure 4:
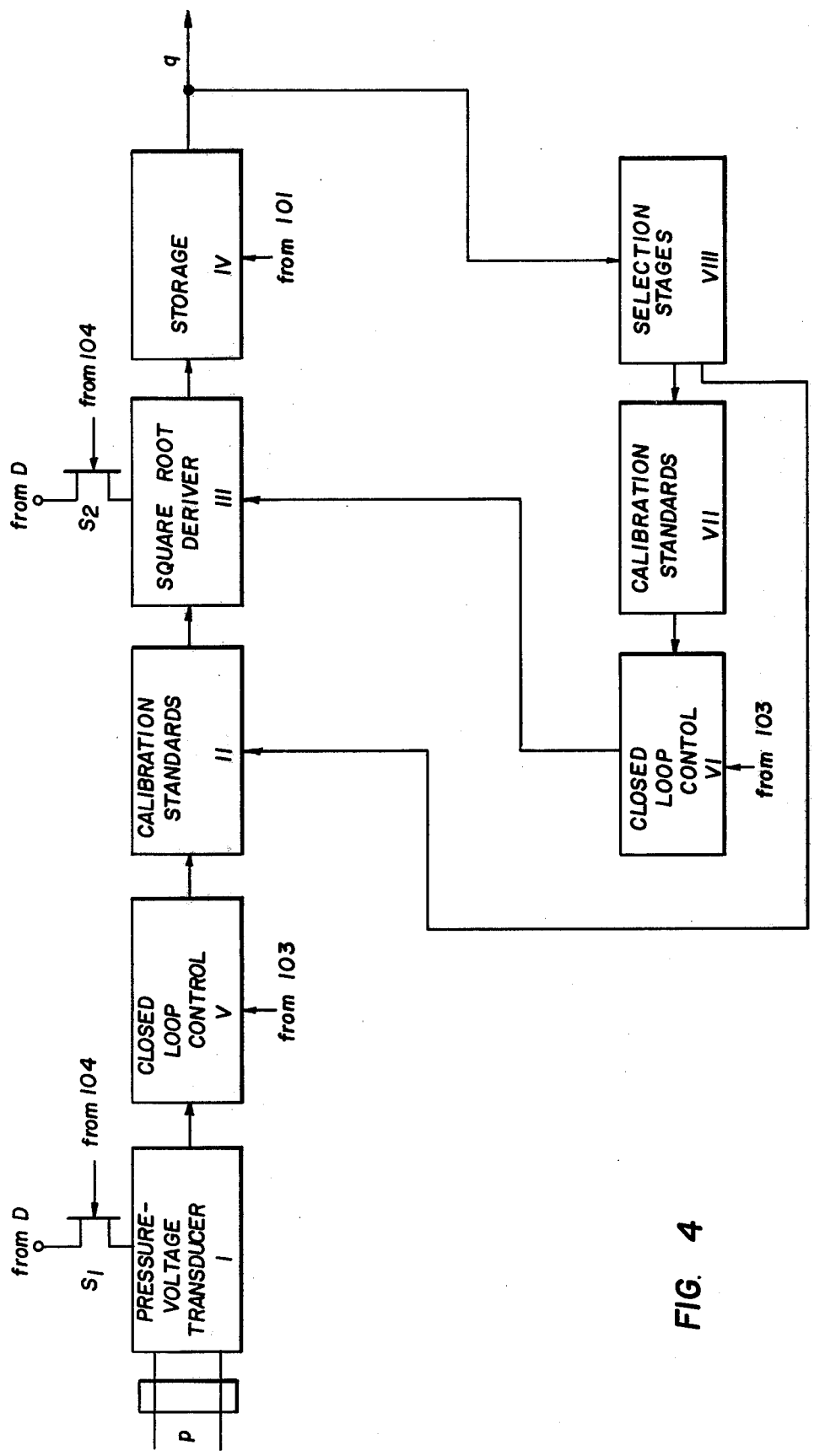
FIG. 4 is a block diagram illustrating, in principle, the volumeter electronics.

The zero balancing for square-root deriver III is effected by the calibration standards II, the closed loop control VI, and the calibration standards VII shown in FIG. 4. The periodic balance signals, shown in FIG. 6, for pressure-voltage transducer I and square root deriver III are delivered by the control circuitry shown in FIG. 5.

In order to be able to use inexpensive square-root deriving circuits, zero balancing of square-root deriver III of FIG. 4 is effected, in each instance, at an adjusting point which is closest to the instantaneous measured volume. The selection of the adjusting point of effected through selection stages VIII of FIG. 4, and corresponding calibration voltages from calibration standards II and VII of FIG. 4 are applied, respectively, to the input and the output of square-root deriver III. By means of the closed-loop control circuit VI of FIG. 4, square-root deriver III is adjusted in a manner to equalize its input and output calibration voltages.

Figure 5:
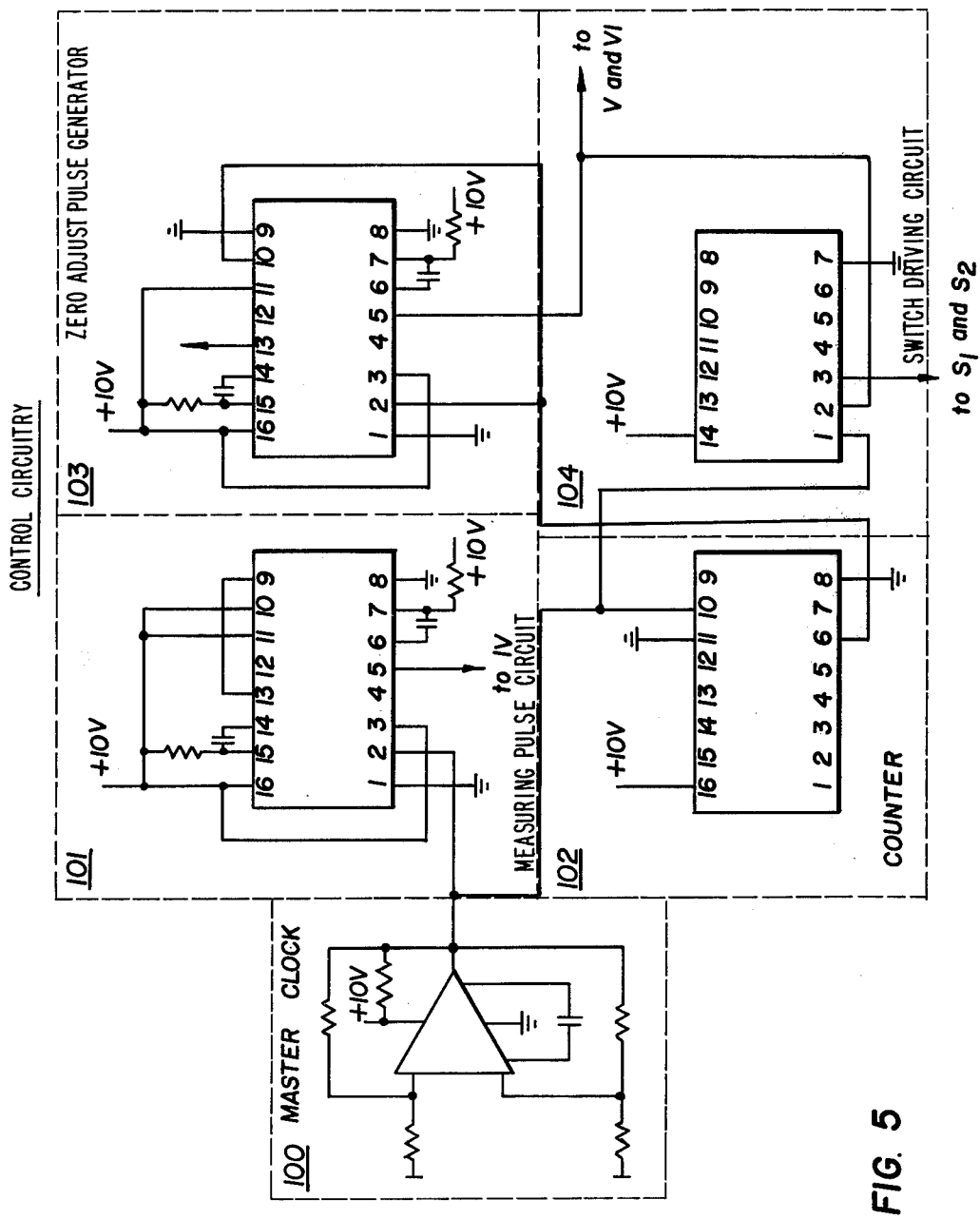
FIG. 5 is a schematic wiring diagram illustrating, in principle, the control circuitry.

The open-loop control circuit shown in FIG. 5 produces several signals which are shown graphically in FIG. 6. A master clock 100 produces basic timing pulses corresponding to the pulse 12 shown in FIG. 6. Thereby, through circuit section 104 and switches S1 and S2, current is supplied to pressure-voltage transducer I and square-root deriver III. The measuring pulse 14, shown in FIG. 6, for pressure-voltage transducer I is produced by circuit section 101 with a time lag as shown at 13 in FIG. 6. The periodic zero adjustment for pressure-voltage transducer I and square-root deriver III is effected, after a certain number of basic timing pulses 12, which are added up by counter 102. With the aid of circuit section 103, and upon release by counter 102, the voltage pulse 15, for pressure-voltage transducer I and square-root deriver is applied thereto by circuit section 104 through switches S1 and S2. The two balancing closed-loop control circuits V and VI of FIG. 4 are switched on and off by a pulse 16, shown in FIG. 6, supplied by circuit section 103.

In operation, the pressure head is measured and processed or balanced periodically by means of pressure head probe 4 and pressure-voltage transducer 8, and as represented by the pulse 14 in FIG. 6. During the subsequent period of interruption between measurements, as indicated at 17 in FIG. 6, the elements having the highest current consumption linked to their functions, i.e. the pressure-voltage transducer I, of FIG. 4, or 8, of FIG. 7 and the square root deriver III of FIG. 4, are disconnected from the voltage supply D by means of switches S1 and S2. Switches S1 and S2 are opened and closed by pulses from circuit 104 to accomplish this. Also during this period 17, the measured and processed signal is stored, by means of a storage circuit IV, so that the water quantity signal Q is permanently available at the output of volumeter 5. Storage circuit IV receives its switching pulses 14, of FIG. 6, from section 101 of FIG. 5.

Figure 3:
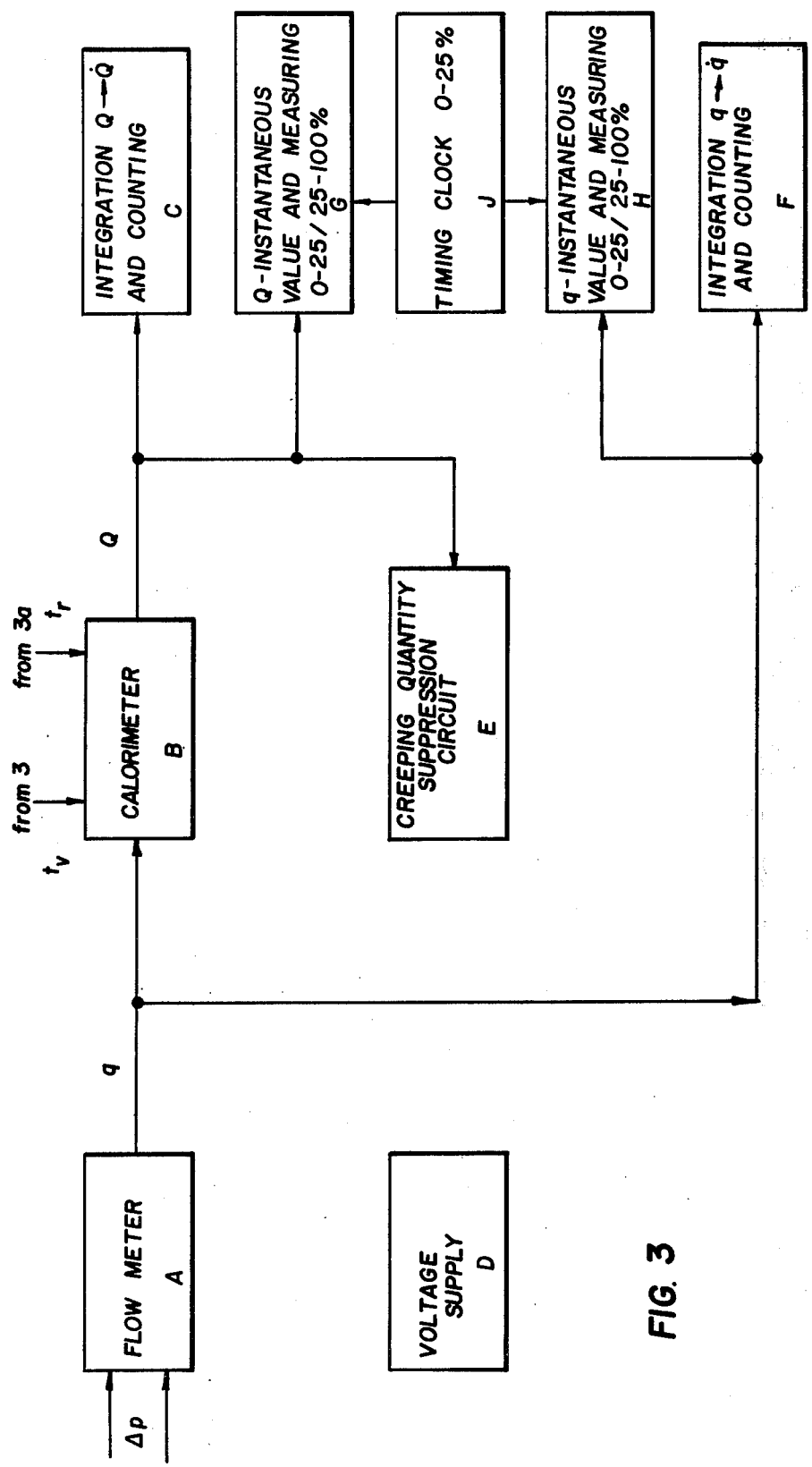
FIG. 3 is a block diagram of the electronic heat amount meter.

Considering the heat amount meter 1 diagrammatically illustrated in FIG. 3, the basic equation underlying the operation is, for the heat amount Q:

$$Q = q \cdot (\theta_1 - \theta_2) \cdot k_2$$

where q is the water quantity flowing through, determined in accordance with FIG. 4, $\theta_1$ is the leading temperature of the medium, determined with the aid of temperature sensor 3 (FIG. 1), $\theta_2$ is the trailing temperature of the medium, determined with the aid of temperature sensor 3a, and $k_2$ is a factor of valency and proportionality.

The output signal q of flow meter A, derived from volumeter 5, is multiplied, in calorimeter B, with values obtained from temperature sensors 3 and 3a. The temperature of sensor 3 is indicated at $t_v$ and that from sensor 3a is indicated at $t_r$, in FIG. 3. The products $q \cdot \theta_1$ and $q \cdot \theta_2$ thus obtained are then subtracted and the difference is multiplied with the factor $k_2$, this being effected in calorimeter B shown in FIG. 3.

The difference thus evaluated, which corresponds to the heat amount Q, is integrated over the time in a subsequent long-term-stable integrator and, upon reaching a predetermined threshold, zeroized. The reset sides of the integrator are very steep and, therefore, result in only short pulses which are extended in the counter stage, in order to secure the operation of the following integration and counting element C of FIG. 3.

The number of integrator reset pulses is a direct measure of the heat amount $\dot{Q}$ withdrawn during the respective period of time.

In a second integrator and counting element F, the water quantity signal q of volumeter 5 is integrated over the time in the same manner, to obtain the rate of flow of the heat carrier. The number of these reset pulses is then the measure for the rate of flow q of the heat carrier in the respective period of time, as indicated by the element F of FIG. 3. The instantaneous value indications, provided by the elements G and H of FIG. 3, permit determining the instantaneous rate of flow and the instantaneous heat amount output rate. Thus, this indication of the instantaneous values is also an auxiliary means usable, for example, for effecting a rapid adjustment of flow controllers.

For a better resolution and reading of values, each of the quantities q and Q is associated with two measuring ranges. The switching of ranges, indicated in elements G and H of FIG. 3, is automatic and is effected at about 25% of the respective maximum value, with a simultaneous indication (timing pulses) in the small measuring range of the element J of FIG. 3. Because expensive actuating elements are omitted, the manipulation with the device, which is accommodated in a splash-proof housing, is simple. The heat amount meter 1 is suitable for processing both continuous and pulse-shaped water quantity signals q. All component parts are of a current-saving construction and, therefore, if necessary, also well suitable for battery operation or the like.

Referring to FIG. 1a, thermogenerator 2 comprises the heat exchanger 18 to which heat is supplied by means of the heated secondary medium 6 flowing through pipes or lines 2a. Between heat exchanger 18 and a cooling plate 21, which is mounted on a wall 20 or the like, the Peltier elements 19 of thermogenerator 2 are mounted and these, in a well-known manner, serve the purpose of generating the needed power. These elements generate a voltage which is proportional to the temperature difference across the elements. The voltage is applied to the in power supply D where it is transformed into the operating voltage needed for supplying the individual component parts. At the output of the transformer, a switching stage in the power supply D provides for an automatic separation of the generator from a buffer circuit also in supply D as soon as the admissible operational values become lower than the actual values. Thus the proper amount of electrical energy is always supplied to the meters.

The connections between power supply or voltage supply D of FIG. 3 and the respective other sections of the circuitry shown in FIGS. 3, 4 and 5 is not shown specifically as it will be well understood by those having average skill in the art. For switching off the heat amount counter and integrator C of FIG. 3, at very small instantaneous heat amount output rates, a creeping quantity suppressing circuit E is provided, as shown in FIG. 3.

While a specific embodiment of the invention has been shown and described in detail to illustrate the application of the principles of the invention, it will be understood that the invention may be embodied otherwise without departing from such principles.

What is claimed is:

1. In an electronic heat amount meter, for a heating installation having a heat carrier medium supply line and a cooled medium return line, the heat amount meter including a computer operating on the analog principle, a volumeter, and electronic circuit means for connection to signal processing devices: the improvement comprising, in combination, a volumeter including thermal energy supply means and comprising at least one substantially unrestricted tubular body connected in series in said supply line and conveying therethrough the heat carrier medium to be measured; at least one first temperature sensor and at least one pressure head probe mounted on said tubular body and operatively associated with the heat carrier medium being supplied through said tubular body; first electronic elements connected to said pressure head probe and operable to convert the pressure head into a first electrical quantity proportional to the volumetric rate of flow of the heat carrier medium flowing through said tubular body; at least one second temperature sensor mounted on said return line and operatively associated with the cooled medium returning therethrough; second electronic elements connected to said first and second temperature sensors and operable to convert the temperature difference between the supplied and returned medium into a second electronic quantity proportional to such temperature difference; said computer being connected to said first and second electronic elements and combining said first and second electronic quantities into a measure of the heat supplied to said heating installation; and an electric generator connected to and operable by said thermal energy supply means of said volumeter and supplying the electrical energy for operation of said heat amount meter; in which said thermal energy supply means of said volumeter comprises a second tubular body coaxially surrounding said first-mentioned tubular body and in radially spaced relation to the latter, said two tubular bodies defining therebetween a completely closed annular space receiving a secondary medium heated by the heat carrier medium; a thermogenerator constituting said electric generator; pipe means connecting said thermogenerator to said completely closed annular space for generation of electric energy by the heat of said secondary medium; and transformer means connected to said thermogenerator and operable to convert the generated electrical energy into operating potentials applied to said heat amount meter.

2. In an electronic heat amount meter, the improvement claimed in claim 1, in which said transformer includes a low voltage electronic element operable to transform the low voltage produced by said thermogenerator into the operating potentials necessary for operating said volumeter and said computer; and electrical elements connected to the output of said low voltage electronic element and operable automatically to switch off said volumeter and said computer periodically.

3. In an electronic heat amount meter, for a heating installation having a heat carrier medium supply line and a cooled medium return line, the heat amount meter including a computer operating on the analog principle, a volumeter, and electronic circuit means for connection to signal processing devices: the improvement comprising, in combination, a volumeter including thermal energy supply means and comprising at least one substantially unrestricted tubular body connected in series in said supply line and conveying therethrough the heat carrier medium to be measured; at least one first temperature sensor and at least one pressure head probe mounted on said tubular body and operatively associated with the heat carrier medium being supplied through said tubular body; first electronic elements connected to said pressure head probe and operable to convert the pressure head into a first electrical quantity proportional to the volumetric rate of flow of the heat carrier medium flowing through said tubular body; at least one second temperature sensor mounted on said return line and operatively associated with the cooled medium returning therethrough; second electronic elements connected to said first and second temperature sensors and operable to convert the temperature difference between the supplied and returned medium into a second electronic quantity proportional to such temperature difference; said computer being connected to said first and second electronic elements and combining said first and second electronic quantities into a measure of the heat supplied to said heating installation; and an electric generator connected to and operable by said thermal energy supply means of said volumeter and supplying the electrical energy for operation of said heat amount meter.

4. In an electronic heat amount meter, the improvement claimed in claim 3, in which said computer includes known electronic switching elements operating, on the analog principle, for the analog processing of the differential temperature and the volume of the heat carrier medium; said computer further comprising additional electronic switching circuit elements operable, respectively, to indicate instantaneous values of the supplied heat with an automatic switching arrangement, and to indicate a measuring range of the supplied heat in a current-saving manner, to provide self-checking of the operating capability of aid heat amount meter; said computer including means operable to automatically suppress minimum signal levels.

5. In an electronic heat amount meter, the improvement claimed in claim 3, in which said pressure head probe measures the differential pressure to produce an output signal; a pressure-voltage transducer connected to said probe and operable to convert said output signal into a voltage proportional to the pressure head; and an electronic square-root deriver connected to said pressure-voltage transducer for supply of said voltage proportional to the pressure head to said square-root deriver; said square-root deriver providing an output signal proportional to the heat carrier medium quantities.

6. In an electronic heat amount meter, the improvement claimed in claim 3, in which said pressure head probe comprises a probe forming the mean value over the flow cross-section of said primary medium.

7. In an electronic heat amount meter, the improvement claimed in claim 5, including mechanical and electronic circuit elements operable to effect automatic and periodic zero balancing of said pressure-voltage transducer and said square-root deriver.

8. In an electronic heat amount meter, the improvement claimed in claim 7, including electronic switching elements operable to periodically disconnect the supply voltage from said pressure-voltage transducer and said square-root deriver.

9. In an electronic heat amount meter, the improvement claimed in claim 8, including electronic switching elements operable to store the heat carrier medium output signal during the period when the supply voltage is disconnected and during the zero balancing operation.

10. In an electronic heat amount meter, the improvement claimed in claim 7, including electronic switching elements operable to adjust the actual square-root deriving operation to the desired square-root deriving operation at a point and as a function of said output signal.

11. In an electronic heat amount meter, the improvement claimed in claim 10, including electronic switching elements operable to store the signal during the period when the voltage supply is cut off and during the zero balancing operation.

12. In an electronic heat amount meter, the improvement claimed in claim 3, in which said pressure head probe includes bistable solenoid valves for closing the connection between said pressure head probe and said first electronic elements, said pressure head probe comprising at least two pressure input lines for measuring pressure at at least two places in said tubular body, said bistable solenoid valves permitting flow and equalization of pressure between said two pressure input lines when said connection between said pressure head probe and first electronic elements is closed.

* * * * *